April 8, 1924. 1,489,983
J. L. DALE
RAT TRAP
Filed March 26, 1923
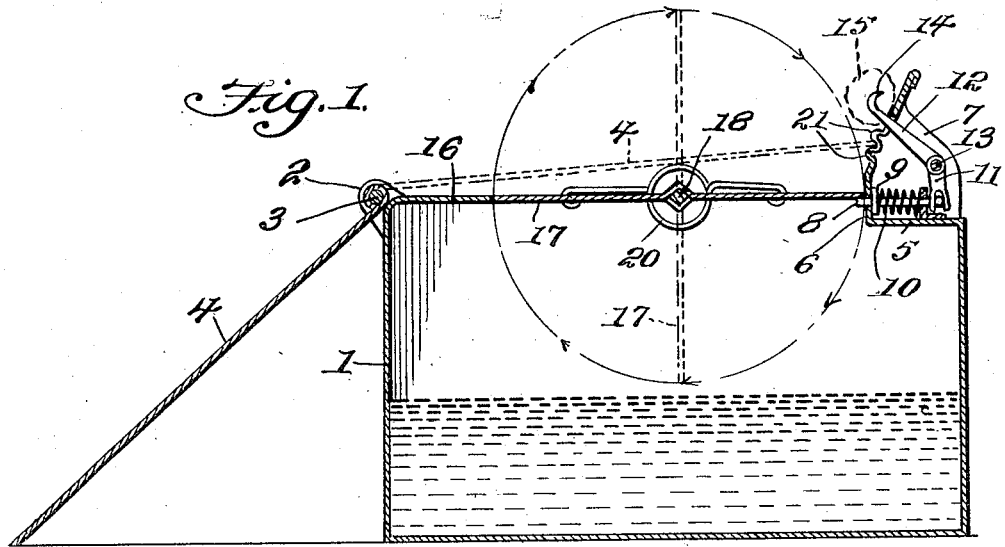
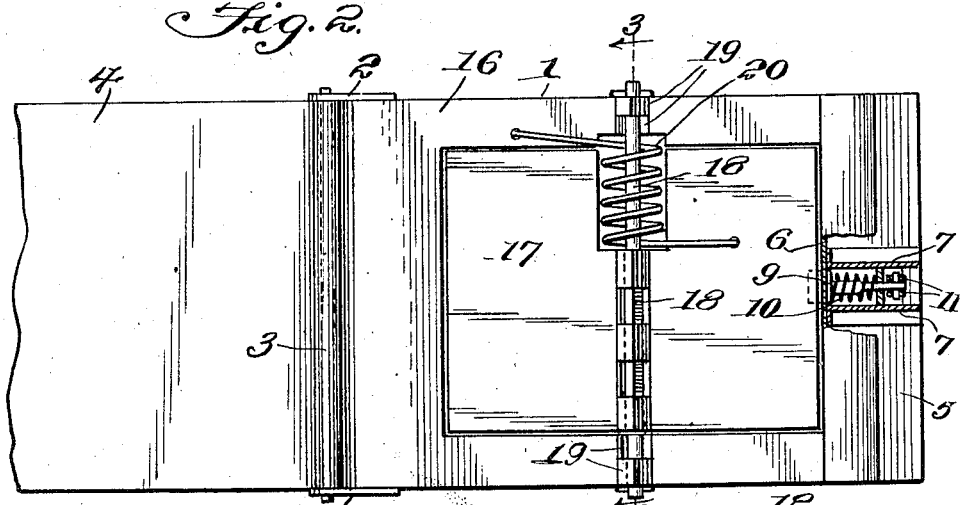
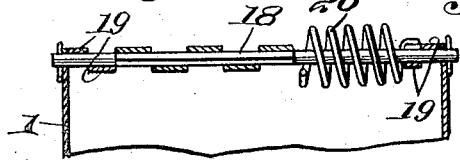
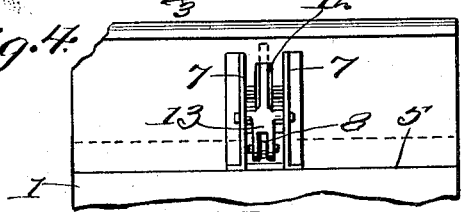
Joseph L. Dale INVENTOR Patented Apr. 8, 1924.

1,489,983

UNITED STATES PATENT OFFICE.

JOSEPH L. DALE, OF WISE, VIRGINIA.

RAT TRAP.

Application filed March 26, 1923. Serial No. 627,806.

*To all whom it may concern:*

Be it known that I, JOSEPH L. DALE, a citizen of the United States, residing at Wise, in the county of Wise and State of Virginia, have invented new and useful Improvements in Rat Traps, of which the following is a specification.

An object of this invention is to produce an animal trap, especially designed for trapping small animals, such as rodents, in which a water containing receptacle has its open top closed by a pivotally mounted spring influenced platform, normally held against movement by a catch, the latter designed to be operated by a trigger in the nature of a bait hook, and whereby, when the rodent travels onto the platform and nibbles at the bait, the latching means will release the platform to permit the rotation of the latter and to precipitate the rodent into the liquid in the receptacle, the latch again moving into position to provide a stop for the platform.

A further object is to produce an animal trap that includes a receptacle having a spring wound platform closing the top thereof, spring influenced latching means holding the platform against movement, trigger means for operating the catch means, and a shelf designed when swung from one position to serve as a plane over which the rodent travels to obtain access to the bait that is attached to the trigger, and further designed when the device is not in use to be swung over the platform to prevent the accidental rotation of the latter.

To the attainment of the foregoing and other objects which will present themselves as the nature of the invention is better understood, reference is to be had to the drawings which accompany and which form part of this application.

In the drawings:

Figure 1 is an approximate central vertical sectional view through the trap.

Figure 2 is a top plan view thereof.

Figure 3 is a sectional view on the line 3—3 of Figure 2.

Figure 4 is a fragmentary plan view looking toward the trigger.

As described by the drawing, I make use of a substantially rectangular receptacle 1. In this receptacle I pour a fluid which may be in the nature of water or water diluted with a poison.

At the front corner of the receptacle 1 there are outstanding ears 2 and between these ears there is pivoted as at 3 a plate 4. At its opposite upper corner, the receptacle 1 is formed with a central depressed portion to define a horizontal ledge 5, and an inner upstanding wall 6, the latter being extended at a rearward inclination a considerable distance. Extending centrally from the depressed portion are upstanding parallel sides 7. The pocket formed by the depressed portion receives therein spring influenced latching means for the revoluble platform hereinafter to be described. The latch is in the nature of a bolt 8 having an inner enlargement or head 9 for contact with the inner face of the wall 6 of the pocket and limiting the movement of the bolt under the influence of a spring 10. The bolt is slidable through suitable guides as well as through the opening in the wall 6. To the rear of the bolt is loosely connected, the lower angular arm 11 of a trigger member 12, the trigger is pivoted as at 13 between the side walls 7 of the pocket and passes angularly through an opening in the front wall of the pocket. The upper end of the trigger is hooked as at 14 to engage with the bait 15.

The top 16 of the receptacle 1 is partly open, the said opening however, being closed by a plate in the nature of a platform 17. The platform preferably comprises two sections in the nature of leaves through the knuckles of which is passed a pintle 18 that is received in suitable bearings 19 in the top of the receptacle 1. Secured to the platform 17 there is one arm of a coiled spring 20 which surrounds the pintle 18 and is received in a cutaway portion in the shelf, the second end of the coiled spring 20 is secured to the top of the receptacle 1 as clearly shown in Figure 2 of the drawing.

The trap is set by first depressing the trigger to retract the latch 8 so that the operator can turn the platform 17 on its pivot 18 to wind the spring 20, the platform is then held in alignment with the top of the receptacle and pressure upon the trigger is released. The bait is arranged on the hooked end of the trigger and the plate 4 is swung to a downward inclination as shown in Figures 1 and 2 of the drawings, a rodent or other animal travels on the inclined plane provided by the platform 4 and from thence over the top and onto the platform 17. The animal nibbling at the bait 15 will swing the trigger 12 causing the latter to retract the latch 8, permitting the spring 20 to turn the platform in the direction of the arrows as shown in Figure 1 to precipitate the animal into the receptacle causing said animal to be either drowned in the water in the receptacle, or exterminated by poison contained in the water. In the meantime, the platform 17 further revolves until the same is again brought into contact with the projecting end of the bolt 8 which holds the said platform in a horizontal position and the device set for catching another animal.

Rising from the wall 6 of the pocket is an inclined wall, at points below the normal position of the trigger and on the sides provided by the opening therein this inclined wall is formed with spaced lugs 21. These lugs are designed to be received by the plate 4 when the latter is swung over the receptacle as indicated by the dotted lines in Figure 1 of the drawing. When in such position, the plate 4 is, of course, latched and prevents the platform from accidental turning.

It is thought that the foregoing description, when taken in connection with the accompanying drawings, will fully set forth the construction and advantages of my improvements to those skilled in the art to which this invention relates, it being understood that the trapped and exterminated animals are removed from the receptacle by permitting the platform to swing to open position, and while I have illustrated and described said embodiment of the improvements, I do not desire to be restricted to the precise features herein set forth but hold myself entitled to such changes therefor as fall within the scope of what I claim.

Having thus described the invention, I claim:

In an animal trap, a fluid containing receptacle, a plate hingedly supported at the upper and outer corner thereof and providing an inclined approach to the top of the receptacle, said receptacle having a central depression providing a pocket at the opposite corner thereof, a rearwardly and upwardly inclined wall at the inner end of said pocket, a spring influenced bolt in said pocket and movable through said wall, means for limiting the movement of said bolt, a trigger having a hooked end disposed in front of said wall and said trigger passing through a slot in the wall and pivoted in rear thereof, said trigger having connection in the rear of the wall with the latch bolt, a platform comprising a pair of plates having their confronting ends provided with interengaging means, a pivot passing therethrough and supported on the casing, a coil spring surrounding the pivot and secured to one of the plates and to the casing, and lugs on said upwardly and rearwardly inclined wall for latching the pivoted plate thereto when the latter is swung over the receptacle.

In testimony whereof I affix my signature.

JOSEPH L. DALE.